United States Patent
Sakurai

(10) Patent No.: US 8,437,634 B2
(45) Date of Patent: May 7, 2013

(54) WAVELENGTH SELECTIVE OPTICAL SWITCH DEVICE

(75) Inventor: Yasuki Sakurai, Aichi (JP)

(73) Assignee: Santec Corporation, Komaki, Aichi Pref. (JP)

(*) Notice: Subject to any disclaimer, the term of this patent is extended or adjusted under 35 U.S.C. 154(b) by 313 days.

(21) Appl. No.: 12/981,736

(22) Filed: Dec. 30, 2010

(65) Prior Publication Data

US 2012/0128355 A1    May 24, 2012

(30) Foreign Application Priority Data

Nov. 18, 2010   (JP) ................... 2010-257629

(51) Int. Cl.
   *H04J 14/00* (2006.01)
(52) U.S. Cl.
   USPC .................... 398/45; 398/46; 398/48
(58) Field of Classification Search ........... 398/45–51
   See application file for complete search history.

(56) References Cited

U.S. PATENT DOCUMENTS

| | | | |
|---|---|---|---|
| 6,707,959 B2 | 3/2004 | Ducellier et al. | |
| 7,162,115 B2 | 1/2007 | Brophy et al. | |
| 7,397,980 B2 | 7/2008 | Frisken | |
| 2006/0067611 A1 | 3/2006 | Frisken et al. | |
| 2006/0193556 A1* | 8/2006 | Frisken | 385/27 |
| 2008/0316585 A1* | 12/2008 | Cohen et al. | 359/303 |
| 2009/0219601 A1* | 9/2009 | Corem et al. | 359/279 |
| 2010/0316385 A1* | 12/2010 | Suzuki et al. | 398/87 |

FOREIGN PATENT DOCUMENTS

| | | |
|---|---|---|
| JP | 2008-298865 | 12/2008 |
| JP | 2009-036903 | 2/2009 |
| WO | 2009/001847 | 12/2008 |

OTHER PUBLICATIONS

P. F. McManamon, et al., "A Review of Phased Array Steering for Narrow-Band Electrooptical System", Proceeding of the IEEE, vol. 97, No. 6, pp. 1078-1096, Jun. 2009.

P. F. McManamon, et al., "Optical Phased Array Technology", Proceeding of the IEEE, vol. 84, No. 2, pp. 268-298, Feb. 1996.

* cited by examiner

*Primary Examiner* — Dzung Tran
(74) *Attorney, Agent, or Firm* — McGlew and Tuttle, P.C.

(57) ABSTRACT

In a wavelength selective optical switch device that disperses a WDM light beam according to their wavelengths. Dispersed light beams is applied to a wavelength selecting element. Incident light beams are separately reflected in different directions according to their wavelengths by use of the multi-level optical phased array. In the optical phased array, even when the number of multi levels is small, by setting the maximum phase shift amount of the phased array to be at least 1.5 π and less than 2.0 π, wavelength dependence is reduced, thereby reducing crosstalk. In this manner, the wavelength dependence, in turn, crosstalk can be reduced.

11 Claims, 9 Drawing Sheets

F I G. 1A
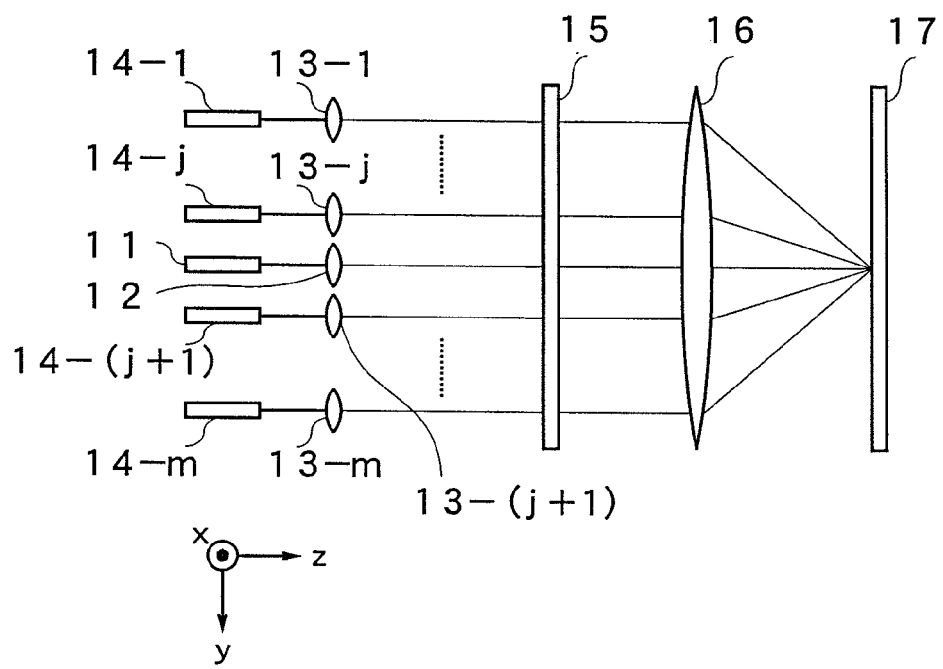
F I G. 1B
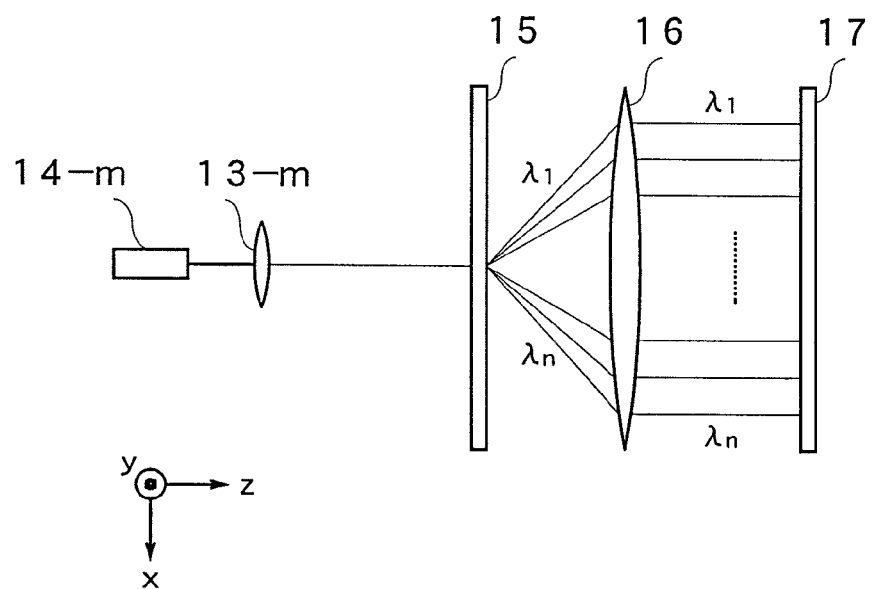

F I G. 4 A
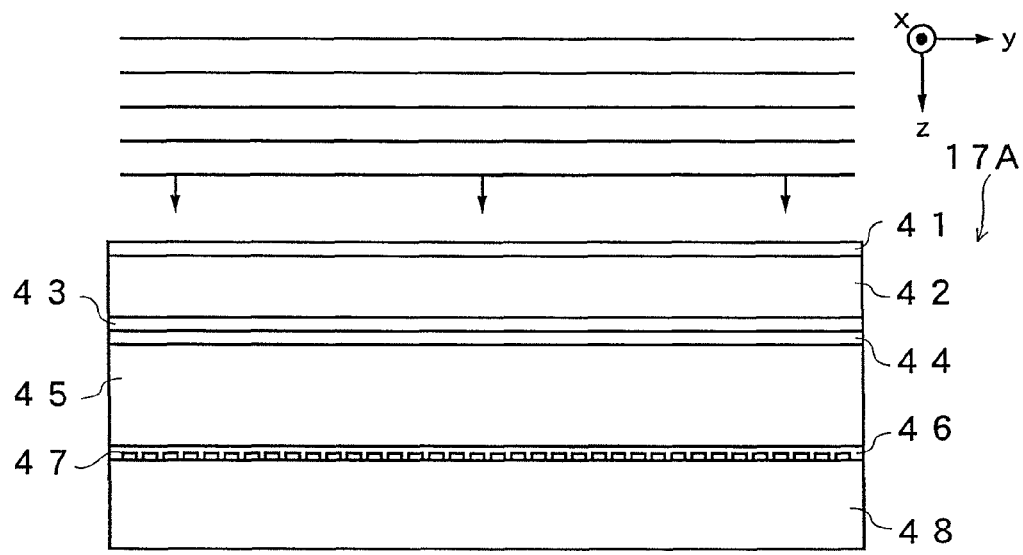
F I G. 4 B
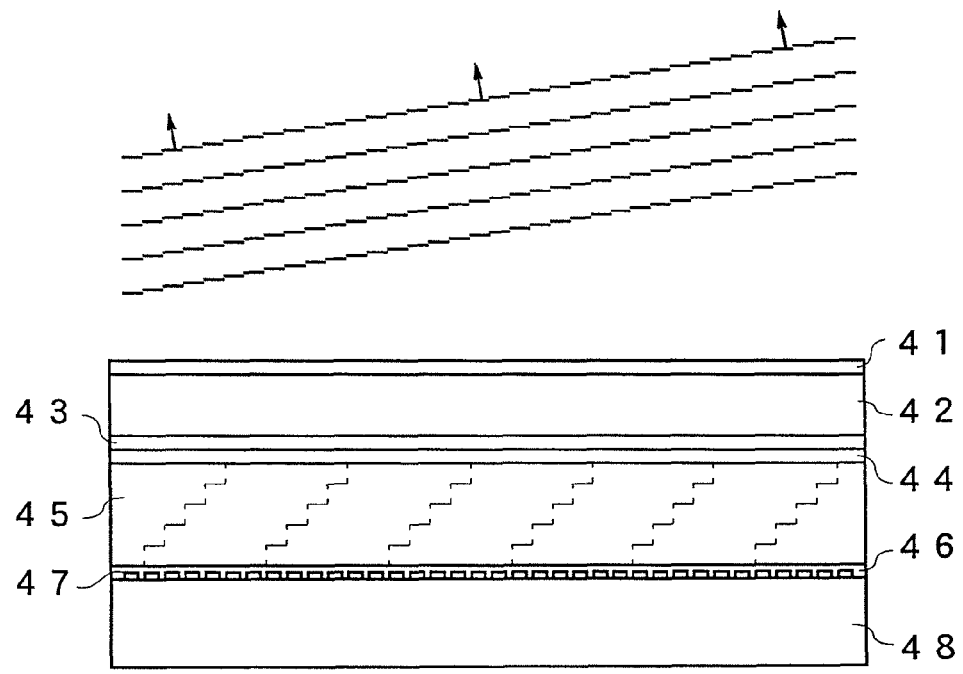

F I G. 7 A
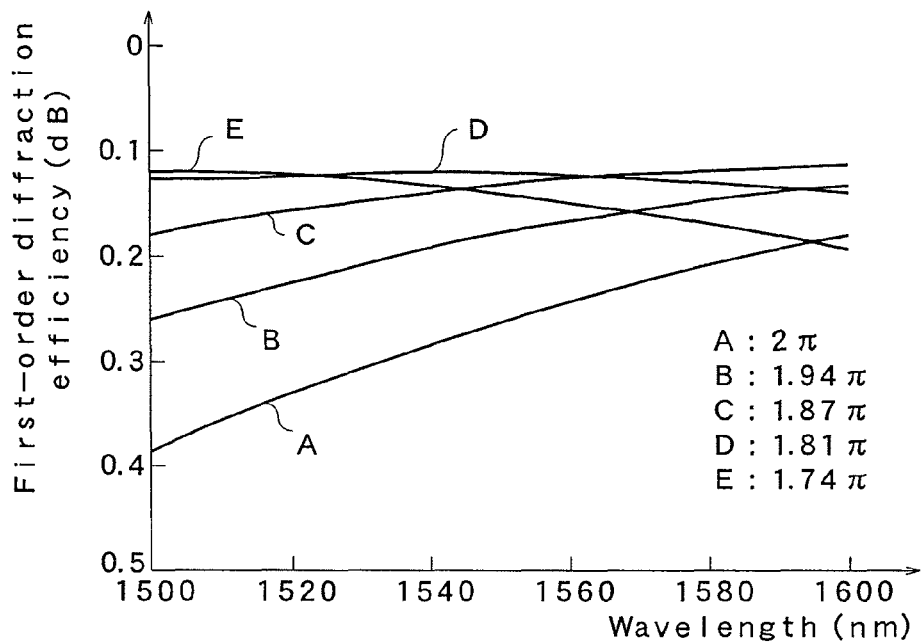
F I G. 7 B
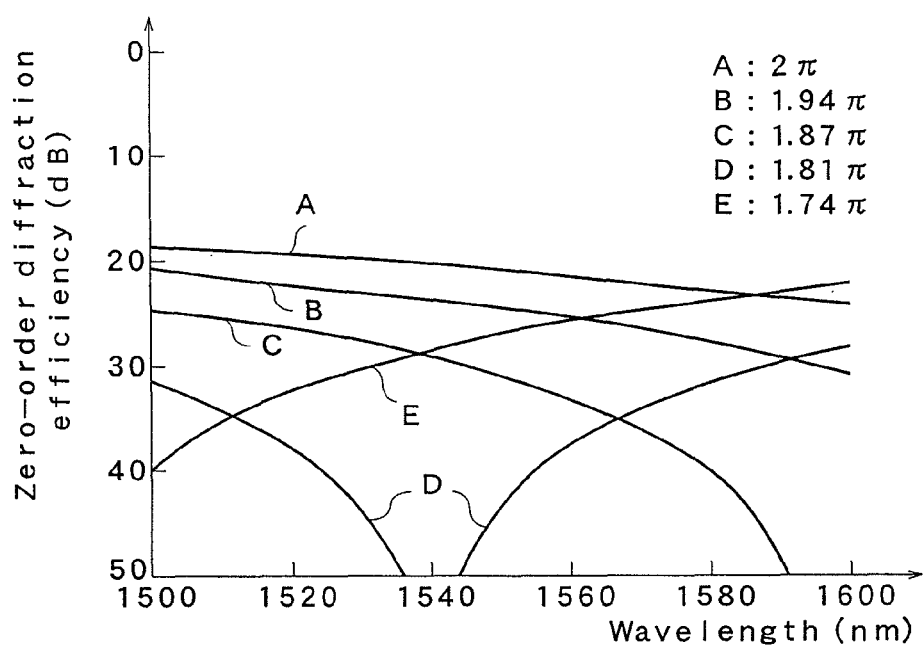

WAVELENGTH SELECTIVE OPTICAL SWITCH DEVICE

BACKGROUND OF THE INVENTION

1. Field of the Invention

The present invention relates to a wavelength selective optical switch device used at a node or the like in an optical communication system.

2. Discussion of the Related Art

A wavelength multiplexing optical communication technique is applied to a high-speed and large-capacity optical network that supports today's advanced information-telecommunication society. A ROADM (Reconfigurable Optical Add Drop Multiplexer) device having a reconfigurable add-drop function has been increasingly introduced to an optical node, which is a branch point in the optical network. To realize the ROADM device, a wavelength selective switch (also referred to as WSS) for switching light having a desired wavelength to a desired direction has received attention. A light beam deflection element for selecting wavelength and deflecting a light beam to a desired output port is used in the wavelength selective switch. U.S. Pat. No. 7,162,115B2 and U.S. Pat. No. 6,707,959B2 propose a light beam deflection element utilizing mechanical displacement of an MEMS (Micro-Electro-Mechanical System) mirror array, and US2006/0067611A1 and U.S. Pat. No. 7,397,980B2 propose a light beam deflection element utilizing a diffraction phenomenon of an LCOS (Liquid crystal on silicon) element.

In the optical communication field, in order to meet increasing demand for an increase in transmission capacity in recent years, a higher transmission rate and new modification format have been actively researched and developed, and an optical network has become complicated. In such optical network, the optically variable filter capable of changing a light beam having a desired wavelength in optical signal is used. In such optical filter, in order to achieve optimum filtering with respect to the transmission rate and modification format of each optical signal, there is a demand for a function of dynamically controlling a filter center frequency and passband at an optical frequency level in addition to the conventional frequency selective function.

This function can be realized by using the high-definition LCOS element, MEMS mirror array or the like for allotment of a plurality of pixels to each of channels of a WDM signal, that is, light having different wavelengths, and using a multi-level optical phased array for deflection of the light beam.

As described in US2006/0067611A1, "A Review of Phased Array Steering for Narrow-Band Electrooptical Systems" by Paul F. Mcnamonetal., Proceeding of the IEEE, Vol. 97, No. 6, pp. 1078-1096, June 2009, and "Optical Phased Array Technology" by Paul F. Mcnamon et al., Proceeding of the IEEE, Vol. 84, No. 2, pp. 268-298, February 1996., in the conventional multi-level optical phased array, a maximum phase shift amount in design wavelength has been generally set to $2\pi$.

SUMMARY OF THE INVENTION

In a wavelength selective element using such multi-level optical phased array, when the number of multi levels is small, a light beam deflection angle can be designed to be large. However, there has been a problem that, when the maximum phase shift amount is set to $2\pi$, large wavelength dependence occurs in a diffraction efficiency of desired order in an optical communication wavelength band, thereby increasing loss. Further, there has been another problem that a light beam deflection angle becomes smaller, causing a difficulty in separation of the light beam, thereby generating stray light to the other diffraction order and deteriorating crosstalk between ports.

In consideration of the problems of the conventional multi-level optical phased array, a technical object of the present invention is to prevent large wavelength dependence from occurring in the diffraction efficiency of desired order in the optical communication wavelength band even when the number of multi levels is small, thereby reducing crosstalk.

In order to solve the problems, a first aspect of the present invention is directed to a wavelength selective optical switch device which comprises: an entrance/exit section which receives a WDM signal light beam composed of multi-wavelength light, and allows exit of optical signal of selected wavelengths; a wavelength dispersion element which spatially disperses the WDM signal light beam according to their wavelengths and multiplexing reflected light beams; a light condensing element which condenses light beams dispersed by said wavelength dispersion element; a wavelength selective element which has a plurality of pixels that are placed on positions to receive incident light developed over an xy plane composed of an x-axis direction developed according to wavelength and a y-axis direction perpendicular to the x-axis direction, and arranged in a lattice pattern on the xy plane, the wavelength selective element being used as a multi-level optical phased array to periodically change a phase shift characteristic of each two-dimensional pixel; and a wavelength selective element driving unit which drives each of the pixels arranged in the x-y directions of said wavelength selective element to change the phase shift characteristic according to wavelength and reflects light beams in different directions according to their wavelengths, wherein a maximum phase shift amount of said optical phased array is set at least $1.5\pi$ and less than $2.0\pi$.

In the wavelength selective optical switch device, said wavelength selective element may be a MEMS element having a plurality of pixels arranged in a two-dimensional manner, and said wavelength selective element driving unit controls a voltage applied to each pixel according to the wavelength selective characteristics.

In order to solve the problems, a second aspect of the present invention is directed to a wavelength selective optical switch device which comprises: an entrance section which receives a WDM signal light beam composed of multi-wavelength light; a wavelength dispersion element which spatially disperses said WDM signal light beam received from said entrance section according to their wavelengths; first light condensing element which condenses WDM light beams dispersed by said wavelength dispersion element; a wavelength selective element which has a plurality of pixels that are placed on positions to receive incident light developed over an xy plane composed of an x-axis direction developed according to wavelength and a y-axis direction perpendicular to the x-axis direction, and arranged in a lattice pattern on the xy plane, the wavelength selective element being used as a multi-level optical phased array to periodically change a phase shift characteristic of each two-dimensional pixel; a wavelength selective element driving unit which drives each of the pixels arranged in the x-y directions of said wavelength selective element to change the phase shift characteristic according to wavelength and transmit light beams in different directions according to their wavelengths; a second light condensing element which condenses light beams of different wavelengths transmitted through said wavelength selective element; a wavelength synthesizing element which synthesizes dispersed light beams condensed by said second light condensing element according to incidence position; and at least one exit section which allows exit of the light beam synthesized by said wavelength synthesizing element, wherein: a maximum phase shift amount of said optical phased array is set at least $1.5\pi$ and less than $2.0\pi$.

In the wavelength selective optical switch devices, said wavelength selective element may be an LCOS element having a plurality of pixels arranged in a two-dimensional manner, and said wavelength selective element driving unit may control a voltage applied to each pixel according to the wavelength selective characteristics.

In the wavelength selective optical switch devices, said wavelength selective element may be a liquid crystal element having a plurality of pixels arranged in a two-dimensional manner, and said wavelength selective element driving unit may control a voltage applied to each pixel according to the wavelength selective characteristics.

In the wavelength selective optical switch devices, the number of multi-levels of said optical phased array may be at least 5 and the maximum phase shift amount of said optical phased array is at least $1.6\pi$.

In the wavelength selective optical switch devices, the number of multi-levels of said optical phased array may be at most 20 and the maximum phase shift amount of said optical phased array is at most $1.95\pi$.

According to the present invention having the above-mentioned characteristics, in a switch device for selecting a wavelength by use of the multi-level optical phased array, large wavelength dependence does not occur in the diffraction efficiency of desired order in the optical communication wavelength band even when the number of multi levels is small, resulting in reduced crosstalk.

BRIEF DESCRIPTION OF THE DRAWINGS

FIG. 1A is a diagram showing optical arrangement of a reflection-type wavelength selective optical switch device in accordance with a first embodiment of the present invention as seen in an x-axis direction;

FIG. 1B is a diagram showing optical arrangement of the reflection-type wavelength selective optical switch device in accordance with the first embodiment of the present invention as seen in a y-axis direction;

FIG. 4A is a diagram showing configuration of a wavelength selective element of a wavelength selective optical switch device and inputting of light to the wavelength selective element in accordance with the first embodiment of the present invention;

FIG. 4B is a diagram showing reflection of light from the wavelength selective element;

FIG. 7A is a graph showing wavelength dependence of a first-order diffraction efficiency of the LCOS element in the present embodiment;

FIG. 7B is a graph showing wavelength dependence of a zero-order diffraction efficiency of the LCOS element in the present embodiment;

DESCRIPTION OF THE PREFERRED EMBODIMENTS

First Embodiment

Figure 2A:
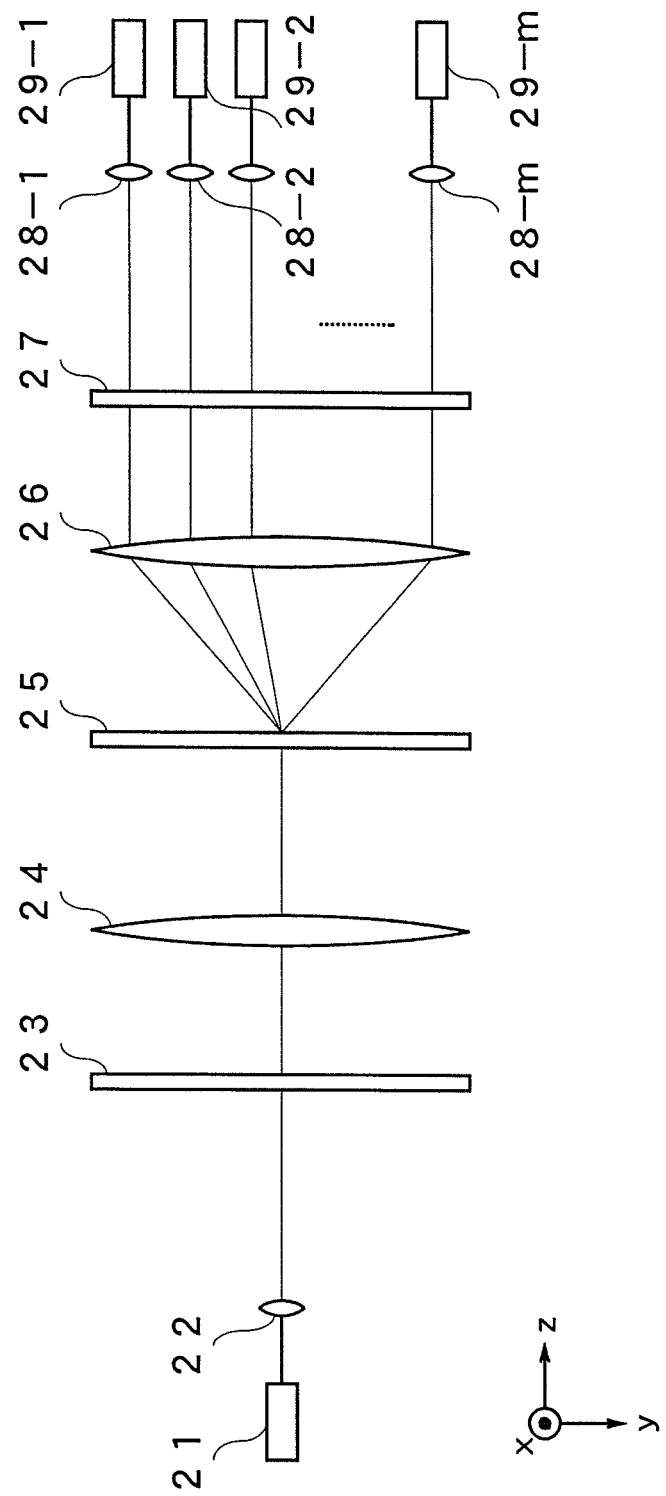
FIG. 2A is a diagram showing optical arrangement of a transmission-type wavelength selective optical switch device in accordance with a second embodiment of the present invention as seen in the x-axis direction.

FIG. 1A is a side view showing a configuration of optical elements constituting a reflection-type wavelength selective optical switch device in accordance with a first embodiment of the present invention as seen in an x-axis direction and FIG. 1B is a side view showing the configuration as seen in a y-axis direction. Incident light is assumed as, for example, a WDM signal light beam resulting from multiplexing of optical signals ranging in wavelength from $\lambda_1$ to $\lambda_n$. The WDM light beam is exited from a collimator lens 12 through an optical fiber 11. Light incident on collimator lenses 13-1 to 13-*m* are inputted to optical fibers 14-1 to 14-*m*. Here, m is a natural number. The light exited from the collimator lens 12 is parallel to a z-axis direction and incident on a wavelength dispersion element 15. The wavelength dispersion element 15 acts to disperse light in different directions on an xz plane according to its wavelength. Herein, the wavelength dispersion element 15 may be constructed of a diffraction grating or prism or the like, or may be constructed of a combination of the diffraction grating and prism. The light beams dispersed by the wavelength dispersion element 15 are fed to a lens 16. The lens 16 is a light condensing element for condensing the light beams dispersed on the xz plane in a direction parallel to the z axis and the condensed light beams are incident on a wavelength selective element 17.

Herein, FIG. 1B shows light having a frequency range from a longest wavelength $\lambda_1$ to a shortest wavelength $\lambda_n$ by way of example. However, incident light is in reality WDM signal light having a lot of spectra in a range from the wavelength $\lambda_1$ to the wavelength $\lambda_n$. Therefore, the beams of WDM signal light developed over the xz plane are directed, in a strip-like form, to the wavelength selective element 17. The wavelength selective element 17 selectively reflects the incident light beams. Selective characteristics of the optical filter are determined on the basis of reflection characteristics of the wavelength selective element 17, which will hereinafter be described in detail. The light beams reflected from the wavelength selective element 17 pass through the same path to enter the lens 16, and are directed to the wavelength dispersion element 15 once again. The wavelength dispersion element 15 focuses the reflected light beams to parallel to z axis, and the light beams are inputted to the optical fibers 14-1 to 14-*m* through the collimator lenses 13-1 to 13-*m*, respectively. Here, the optical fibers 11, 14-1 to 14-m and collimator lenses 12, 13-1 to 13-m constitute a entrance/exit section for receiving a light beam and exiting selected light beams.

Second Embodiment

Figure 2B:
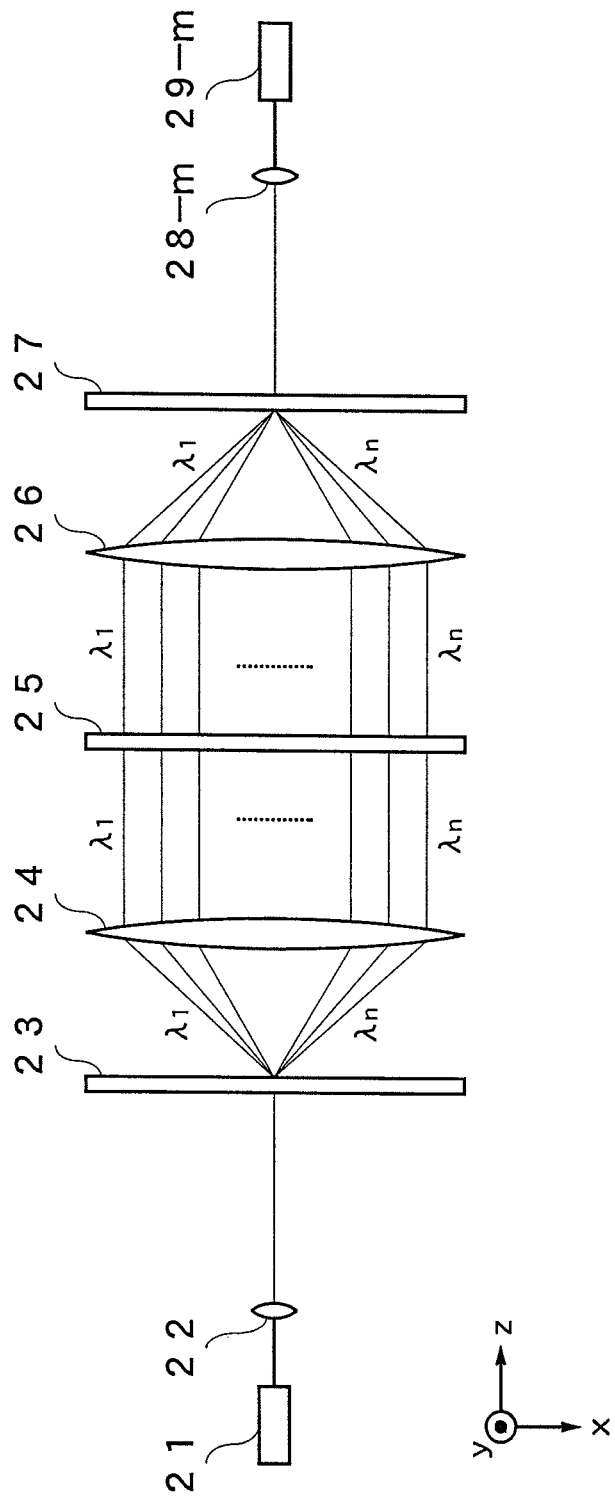
FIG. 2B is a diagram showing optical arrangement of the transmission-type wavelength selective optical switch device in accordance with the second embodiment of the present invention as seen in the y-axis direction.

Next, a transmission-type wavelength selective optical switch device in accordance with a second embodiment of the present invention will be described. FIG. 2A is a side view showing a configuration of optical elements constituting a transmission-type wavelength selective optical switch device in accordance with a second embodiment of the present invention as seen in an x-axis direction and FIG. 2B is a side view showing the configuration as seen in a y-axis direction. In FIG. 2A, similarly, incident light is WDM signal light described in the first embodiment. The WDM signal light is incident on a collimator lens 22 from an optical fiber 21 and fed to a first wavelength dispersion element 23 as parallel light beams. The optical fiber 21 and collimator lens 22 constitute an entrance section for receiving the WDM signal light beam. Like the wavelength dispersion element 15, the wavelength dispersion element 23 may be constructed of a diffraction grating or prism or the like, or may be constructed of a combination of the diffraction grating and prism. As shown in FIG. 2B, the wavelength dispersion element 23 emits light beams on an xz plane in different directions according to their wavelength. These light beams are incident on a lens 24. The lens 24 is a first light condensing element for condensing the light beams dispersed on the xz plane in a direction parallel to the z-axis direction. A wavelength selective element 25 is disposed perpendicular to an optical axis of the lens 24. The wavelength selective element 25 allows the incident light beams to partially pass to desired directions and details thereof will be described later. The light beams passed to the wavelength selective element 25 are incident on a lens 26. The lens 24 and wavelength dispersion element 23, and the lens 26 and a wavelength synthesizing element 27 are symmetric with respect to an xy plane located at the center of the wavelength selective element 25. The lens 26 is a second light condensing element for condensing the parallel light beams on the xz plane. The wavelength synthesizing element 27 synthesizes light beams having different wavelength components from different directions and emits the synthesized light. The light beams synthesized by the wavelength synthesizing element 27 are fed to optical fibers 29-1 to 29-m through collimator lenses 28-1 to 28-m, respectively. The collimator lenses 28-1 to 28-m and optical fibers 29-1 to 29-m constitute an exit section for emitting light beams of selected wavelength.

(Configuration of Wavelength Selective Element)

Next, the wavelength selective elements 17, 25 used in the optically variable filter apparatuses in accordance with the first and second embodiments will be described below. In the first and second embodiments, when the incident light is dispersed on the xz plane according to wavelength and the dispersed light beams are incident on the wavelength selective elements 17, 25 as strip-like light beams, an incident region is defined as a rectangular region R shown in FIG. 3. The optically variable filter apparatus in the first embodiment can select light beams of desired wavelengths by selecting corresponding pixels for reflecting desired direction. The optically variable filter apparatus in the second embodiment can select light beams having desired wavelengths by selecting corresponding pixels for transmitting to desired direction. A setting part 30 is connected to each of the wavelength selective elements 17, 25 through a driver 31. The setting part 30 determines the pixels that reflect or transmit light to desired directions according to selected wavelengths. The setting part 30 and driver 31 constitute a wavelength selective element driving unit for driving each of pixel electrode plates arranged in the xy direction of the wavelength selective element to control characteristics of pixels located at predetermined positions in the x-axis and y-axis directions.

Next, a detailed configuration of the wavelength selective element 17 will be described. The wavelength selective element 17 can be realized by using an LCOS (Liquid Crystal On Silicon)-based liquid crystal element. An LCOS element 17A has a built-in liquid crystal modulation driver located at the back of the element. Accordingly, the number of pixels can be increased, and thus, for example, the LCOS element 19A can be formed of a plurality of pixels arranged in a 1000×1000 lattice pattern. FIG. 4A is a schematic diagram showing the LCOS element 17A. The LCOS element 17A is composed of an AR layer 41, a glass layer 42, a transparent common electrode 43, an alignment layer 44, a liquid crystal 45, an alignment layer 46 including a lot of back reflection electrodes 47 and a silicon layer 48 that are arranged from a light incidence plane along a z-axis direction in a layered structure.

Figure 3:
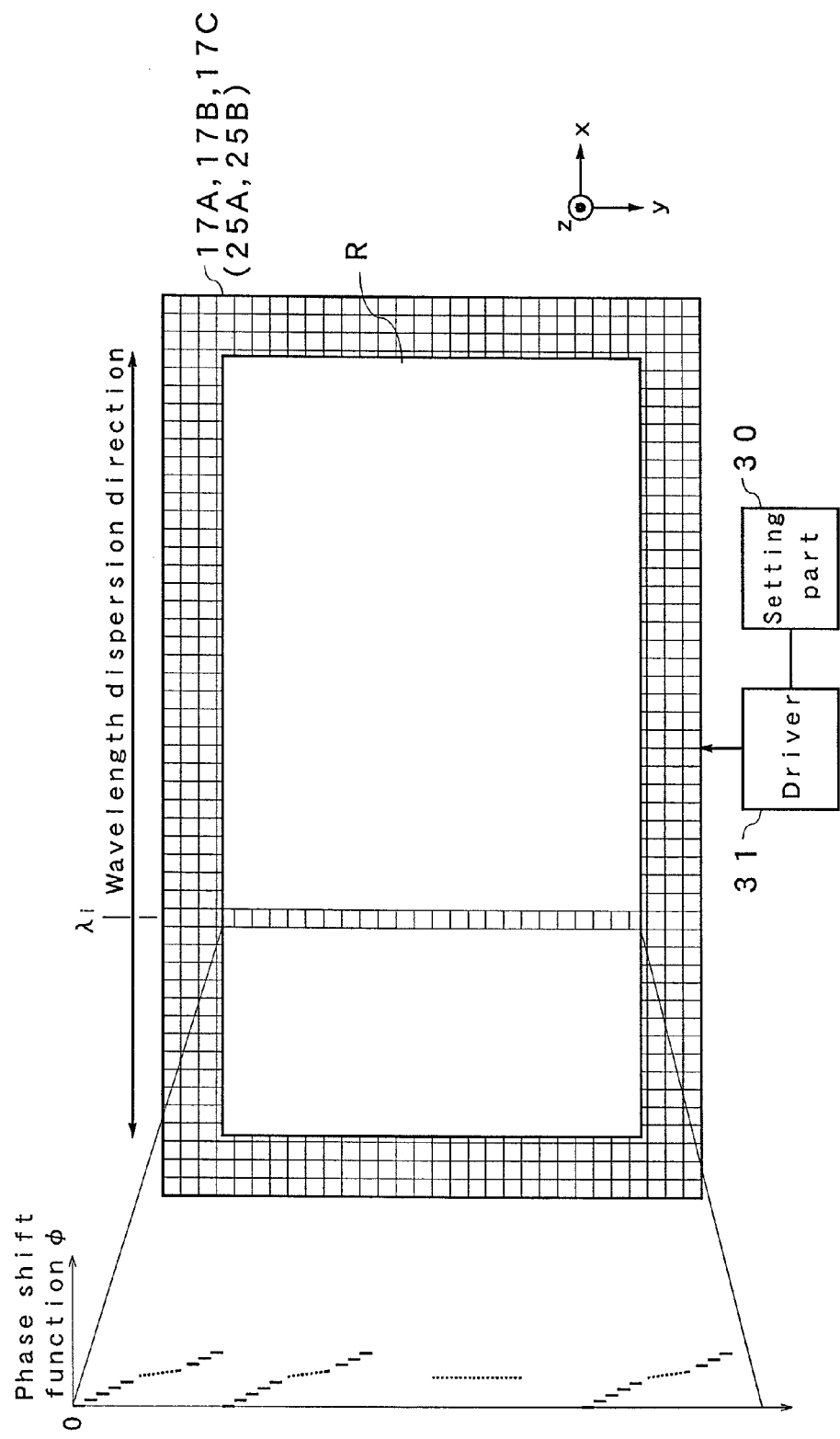
FIG. 3 is a diagram showing a two-dimensional wavelength selective element used in the wavelength selective optical switch devices in accordance with the first and second embodiments of the present invention.
Figure 5:
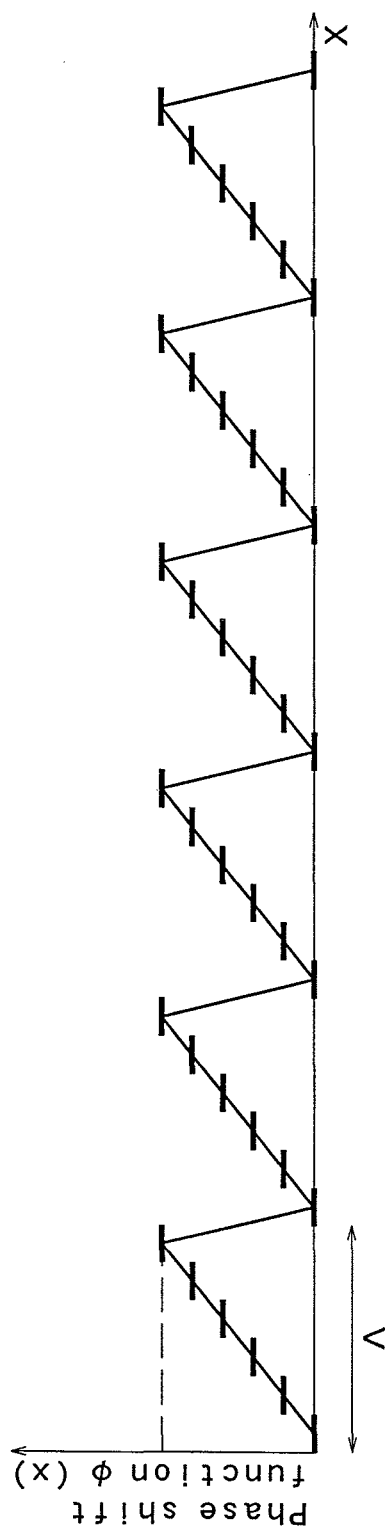
FIG. 5 is a diagram showing relationship between a light incidence position and phase shift in an LCOS element in the present embodiment.

In the LCOS element 17A, light beams are incident separately at different positions according to their wavelengths. That is, the light beams applied to the incident regions are essentially the WDM light beams developed over an xy plane according to wavelength band $\lambda_i$ (i=1 to n). Here, given that a wavelength dispersion direction is an x-axis direction shown in FIG. 3, a lot of pixels arranged in a y-axis direction correspond to each wavelength. For this reason, by periodically applying different voltages to the lot of pixels arranged in the y-axis direction to which light having a certain wavelength $\lambda_i$ of the LCOS element 17A is incident, refraction index, which is represented by a stepped phase shift function and shaped like a saw as a whole, changes as shown in FIG. 3. FIG. 5 is a diagram showing relationship between the phase shift function and a light incidence position. In FIG. 5, the LCOS element performs the same function as a blaze-type diffraction grating by changing the phase shift amount in a phased manner by use of a plurality of pixels, in this case six pixels, and periodically repeating this change. In this figure, a straight sawtooth waveform shows the case of the blaze-type diffraction grating and a stepped waveform shows the case of the LCOS element having many levels. In this manner, the multi-level optical phased array can be achieved through change of the refraction index. Further, the reflection direction can be changed by the diffraction phenomenon, for example, as shown in FIG. 4B. Since the refraction angle of incident light can be changed according to wavelength by appropriately selecting the phase shift function, the LCOS element can be regarded as a characteristic-variable diffraction grating. Accordingly, by applying voltages between the transparent common electrode 43 and the back reflection electrodes 47, the diffraction angles of different wavelength components can be controlled independently, so that input light having a specific wavelength can be reflected in a desired direction, and light having other wavelength components can be diffracted as unnecessary light and reflected in a direction in which the light cannot be emitted.

A following equation (1) shows the diffraction angle of the multi-level optical phased array.

$$\sin\theta_{in}+\sin\theta_{dif}=m\cdot\lambda/\Lambda \tag{1}$$

Wherein,
  q: the number of multi levels,
  m: diffraction order,
  λ: wavelength,
  Λ: phased array pitch, $\theta_{in}$: incidence angle,
$\theta_{diff}$: diffraction angle.

The diffraction efficiency η is approximately found according to a following equation (2).

$$\eta = (\sin(\pi/q)/(\pi/q))^2 \quad (2)$$

Given that a pixel pitch of the LCOS element is d, a relationship represented by a following equation is established between d and the phased array pitch Λ.

$$\Lambda = q \cdot d \quad (3)$$

Figure 6A:
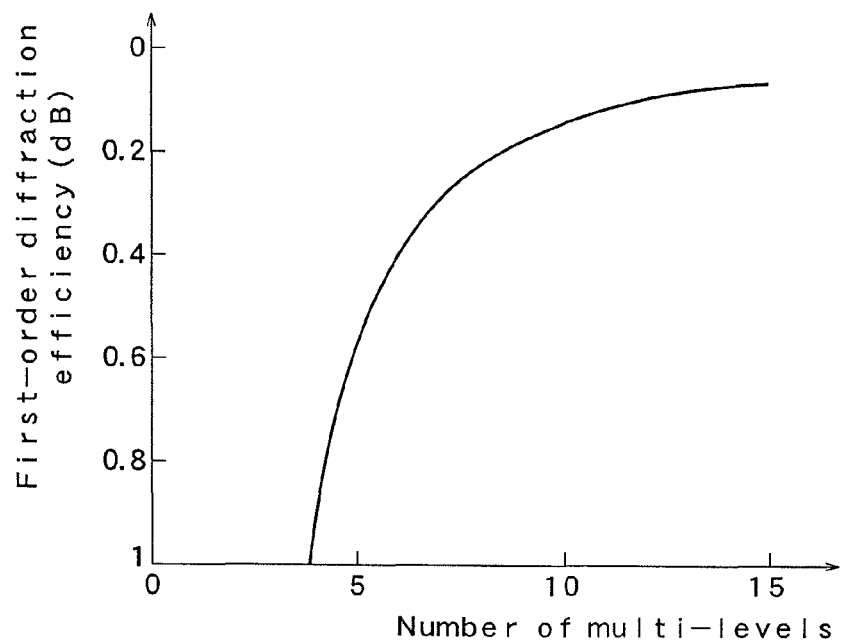
FIG. 6A is a graph showing an example of relationship between the number of multi levels and first-order diffraction efficiency in the LCOS element in the present embodiment.
Figure 6B:
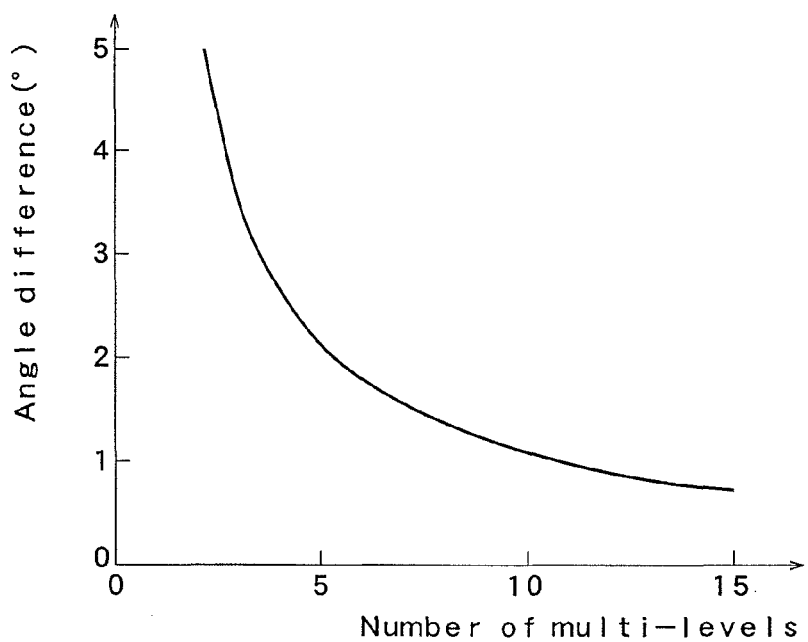
FIG. 6B is a graph showing an example of the number of multi levels and an angle difference between zero-order diffracted light and first-order diffracted light in the LCOS element in the present embodiment.

FIG. 6A shows the first-order diffraction efficiency with respect to the number of multi levels, which is calculated according to the equations (1) and (2) and FIG. 6B shows an example of an angle difference between zero-order diffracted light and first-order diffracted light. In this example, the incidence angle is set to 13.4 degrees, the wavelength λ is set to 1545 nm and the pixel pitch d is set to 8.5 λm. As shown in these figures, as the number of multi levels q increases, the diffraction efficiency increases while the angle difference between the diffracted light decreases. When the angle difference becomes small, it is difficult to separate incident light from reflected light. In other words, as apparent from FIGS. 6A and 6B, there is a trade-off between the diffraction efficiency and angle difference with respect to the number of multi levels. For example, when the number of multi levels q is 11, the diffraction loss is equal to or smaller than 0.2 dB and the angle difference is 0.97 degrees.

Here, relationship among the maximum phase shift amount, the diffraction efficiency, and crosstalk between orders will be described. When the relationship Λ>>λ holds in the light diffraction efficiency and a thickness of a grating layer is sufficiently small, then the diffraction efficiency η is represented according to a following equation (4).

$$\eta = \left| \frac{1}{\Lambda} \int_0^\Lambda \exp(j\Phi(x)) \cdot \exp\left(-j\frac{2 \cdot \pi \cdot m \cdot x}{\Lambda}\right) dx \right|^2 \quad (4)$$

Given the number of multi levels q is 11, when the maximum phase shift amount is changed to 2π, 1.94π, 1.87π, 1.81π and 1.74π, the first-order diffraction efficiency found according to the equation (4) is represented as curves A to E, respectively, as shown in FIG. 7A. As shown in this figure, the wavelength dependence of the first-order diffraction efficiency becomes the highest when the maximum phase shift amount is 2π and becomes the lowest when the maximum phase shift amount is 1.81π as represented by the curve D. FIG. 7B shows the wavelength dependence of the zero-order diffraction efficiency by curves A to E under the same condition. As apparent from this figure, in view of the wavelength dependence of the zero-order diffracted light, the maximum phase shift amount is preferably, 1.81π. Thus, when the number of multi levels is 11, an optimum value of the maximum phase shift amount is 1.81π. As described above, the maximum phase shift amount needs to be appropriately set to an optimum value according to the number of multi levels.

Figure 8:
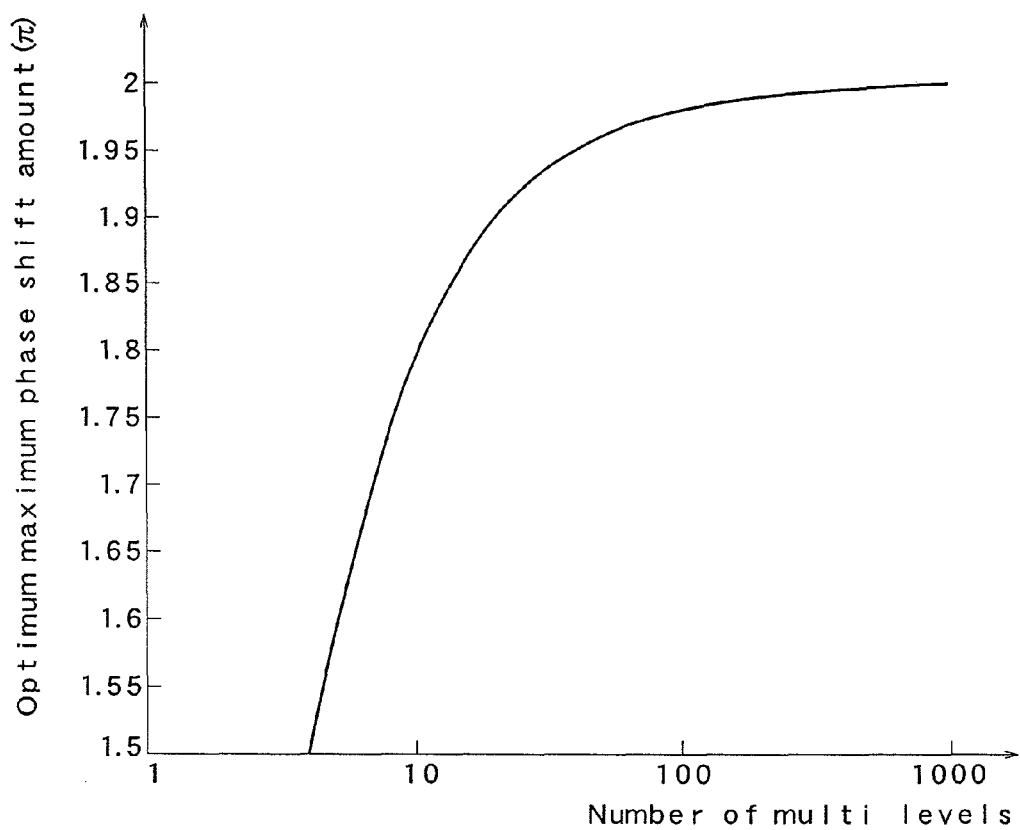
FIG. 8 is a graph showing relationship between the number of multi levels and an optimum maximum phase shift amount in the present embodiment.

FIG. 8 shows relationship between the number of multi levels and optimum maximum phase shift amount. As shown in this figure, when the number of multi levels rises up to 1000, the optimum value of the maximum phase shift amount gets close to 2π, and when the number of multi levels is small, the optimum maximum phase shift amount varies within a scope of 1.5π to 2π. As described above, as the number of multi levels increases, the optimum maximum phase shift amount also increases and gets closer to 2π. On the other hand, when the number of multi levels is about a few dozen, the maximum phase shift amount needs to be less than 2π. For this reason, according to the present invention, the maximum phase shift amount is set to be at least 1.5π and less than 2π. When the number of multi levels is five or larger, it is preferred that the maximum phase shift amount is at least 1.6π. When the number of multi levels is at most 20, it is preferred that the maximum phase shift amount is at most 1.95π.

As a second example of the wavelength selective element 17, a liquid crystal element 17B having a reflection-type two-dimensional electrode array instead of LCOS structure will be described. The LCOS element has the built-in liquid crystal driver located at the back of the element, while the two-dimensional electrode array liquid crystal element 17B is provided with a liquid crystal modulation driver located at the outside of the element. The other configuration of the liquid crystal element 17B is the same as that of the LCOS element and can realize the above-mentioned multi-level optical phased array.

Figure 9:
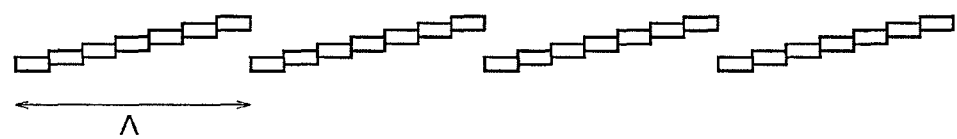
FIG. 9 is a conceptual drawing showing a driving state of MEMS mirrors in the case where an MEMS element is used as the wavelength selective element in the first embodiment.

As a third example of the wavelength selective element 17, a two-dimensional MEMS element 17C will be described. The MEMS element in which a lot of MEMS mirrors are two-dimensionally arranged has been put into practical use as a Digital Micromirror Device (DMD). All pixels in one column of the MEMS mirror in the y-axis direction correspond to one wavelength of the WDM signal. Also in the case of MEMS, since plural pixels of the MEMS element correspond to one wavelength band, a voltage applied to many pixels corresponding to one wavelength is controlled. As shown in FIG. 9, the positions of the pixels of the MEMS element in the z-axis direction can take a sawtooth waveform shape as a whole on a certain cycle, as represented by the phase shift function. Thereby, light beams can be reflected separately in different directions according to their wavelengths of incident light.

Next, a transmission-type wavelength selective element 25 used in a wavelength selective optical switch device in accordance with a second embodiment will be described. A first example of the wavelength selective element 25, a transmission-type two-dimensional LCOS element 25A can be used. The transmission-type LCOS element 25A can be obtained by replacing a back reflection electrode 47 in FIG. 4 with a transparent electrode. Also in this case, since light beams are separately incident at different positions according to their wavelengths, by bringing pixels corresponding to the incident position of a target light beam into a diffractive state to a desired direction, it is possible to select an optical signal thereof. Since in the LCOS element 25A, a plurality of pixels correspond to positions corresponding to a single wavelength in the y-axis direction, by applying voltages between the transparent electrodes, it is possible to impart unevenness to a refractive index profile with respect to the plurality of pixels, thereby developing the diffraction phenomenon. Then, the diffraction angles of different wavelength components can be controlled independently, so that an input light beam having a specific wavelength can be diffracted in a specific direction as shown in FIG. 2A, and light beams having other wavelength components can be diffracted as unnecessary light and diffracted in a direction in which the light cannot be emitted.

As a second example of the wavelength selective element 25, a liquid crystal element 25B having a transmission-type two-dimensional electrode array instead of LCOS structure will be described. The LCOS element has the built-in liquid crystal driver located at the back of the element, while the two-dimensional electrode array liquid crystal element 25B is provided with a liquid crystal modulation driver located at the outside of the element. The other configuration of the liquid crystal element 25B is the same as that of the LCOS element.

In the present embodiment, it is assumed that in the two-dimensional wavelength selective element, all pixels in the y-axis direction having a predetermined x coordinate in the x-axis direction correspond to a specific channel of the WDM signal. However, in a subsequent WDM signal, a frequency band can vary according to each channel. For example, there is a possibility that a first channel has a frequency band of 10 GHz and a second channel has a frequency band of 40 GHz. In such case, it is possible to associate pixels corresponding to 10 GHz with pixels arranged in one column in the y-axis direction, which have commonly one x coordinate. In the second channel, pixels corresponding to 40 GHz with pixels arranged in four columns in the y-axis direction, which have consecutive four x coordinates. In this case, by shifting adjacent four columns of pixels according to the phase shift function, the light beam of the channel can be outputted to a desired output port. Therefore, the phase shift function can be dynamically changed based on setting of a setting unit, thereby improving flexibility.

As has been described in detail, according to the present invention, by making various changes to the reflection characteristics and transmission characteristics of the wavelength selective element, it is possible to select light having a desired wavelength with respect to each of multi-channel WDM signals of many channels. Moreover, the use of a wavelength selective element in which a plurality of bits are assigned to each wavelength makes it possible to vary wavelength selective characteristics freely. Thus, the wavelength selective optical switch device can be used as a main constituent component of a node having the WDM light Add-Drop function.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2010-257629 filed on Nov. 18, 2010 is hereby incorporated by reference.

What is claimed is:

1. A wavelength selective optical switch device comprising:
an entrance/exit section which receives a WDM signal light beam composed of multi-wavelength light, and allows exit of optical signal of selected wavelengths;
a wavelength dispersion element which spatially disperses the WDM signal light beam according to their wavelengths and multiplexing reflected light beams;
a light condensing element which condenses light beams dispersed by said wavelength dispersion element;
a wavelength selective element which has a plurality of pixels that are placed on positions to receive incident light developed over an xy plane composed of an x-axis direction developed according to wavelength and a y-axis direction perpendicular to the x-axis direction, and arranged in a lattice pattern on the xy plane, the wavelength selective element being used as a multi-level optical phased array to periodically change a phase shift characteristic of each two-dimensional pixel; and
a wavelength selective element driving unit which drives each of the pixels arranged in the x-y directions of said wavelength selective element to change the phase shift characteristic according to wavelength and reflects light beams in different directions according to their wavelengths, wherein a maximum phase shift amount of said optical phased array is set at least $1.5\pi$ and less than $2.0\pi$.

2. The wavelength selective optical switch device according to claim 1, wherein
said wavelength selective element is an LCOS element having a plurality of pixels arranged in a two-dimensional manner, and
said wavelength selective element driving unit controls a voltage applied to each pixel according to the wavelength selective characteristics.

3. The wavelength selective optical switch device according to claim 1, wherein
said wavelength selective element is a liquid crystal element having a plurality of pixels arranged in a two-dimensional manner, and
said wavelength selective element driving unit controls a voltage applied to each pixel according to the wavelength selective characteristics.

4. The wavelength selective optical switch device according to claim 1, wherein
said wavelength selective element is a MEMS element having a plurality of pixels arranged in a two-dimensional manner, and
said wavelength selective element driving unit controls a voltage applied to each pixel according to the wavelength selective characteristics.

5. The wavelength selective optical switch device according to claim 1, wherein the number of multi-levels of said optical phased array is at least 5 and the maximum phase shift amount of said optical phased array is at least $1.6\pi$.

6. The wavelength selective optical switch device according to claim 1, wherein the number of multi-levels of said optical phased array is at most 20 and the maximum phase shift amount of said optical phased array is at most $1.95\pi$.

7. A wavelength selective optical switch device comprising:
an entrance section which receives a WDM signal light beam composed of multi-wavelength light;
a wavelength dispersion element which spatially disperses said WDM signal light beam received from said entrance section according to their wavelengths;
a first light condensing element which condenses WDM light beams dispersed by said wavelength dispersion element;
a wavelength selective element which has a plurality of pixels that are placed on positions to receive incident light developed over an xy plane composed of an x-axis direction developed according to wavelength and a y-axis direction perpendicular to the x-axis direction, and arranged in a lattice pattern on the xy plane, the wavelength selective element being used as a multi-level optical phased array to periodically change a phase shift characteristic of each two-dimensional pixel;
a wavelength selective element driving unit which drives each of the pixels arranged in the x-y directions of said wavelength selective element to change the phase shift characteristic according to wavelength and transmit light beams in different directions according to their wavelengths;
a second light condensing element which condenses light beams of different wavelengths transmitted through said wavelength selective element;
a wavelength synthesizing element which synthesizes dispersed light beams condensed by said second light condensing element according to incidence position; and at least one exit section which allows exit of the light beam synthesized by said wavelength synthesizing element, wherein:

a maximum phase shift amount of said optical phased array is set at least $1.5\pi$ and less than $2.0\pi$.

8. The wavelength selective optical switch device according to claim 7, wherein said wavelength selective element is an LCOS element having a plurality of pixels arranged in a two-dimensional manner, and said wavelength selective element driving unit controls a voltage applied to each pixel according to the wavelength selective characteristics.

9. The wavelength selective optical switch device according to claim 7, wherein said wavelength selective element is a liquid crystal element having a plurality of pixels arranged in a two-dimensional manner, and said wavelength selective element driving unit controls a voltage applied to each pixel according to the wavelength selective characteristics.

10. The wavelength selective optical switch device according to claim 7, wherein the number of multi-levels of said optical phased array is at least 5 and the maximum phase shift amount of said optical phased array is at least $1.6\pi$.

11. The wavelength selective optical switch device according to claim 7, wherein the number of multi-levels of said optical phased array is at most 20 and the maximum phase shift amount of said optical phased array is at most $1.95\pi$.

\* \* \* \* \*